(12) United States Patent
Wang et al.

(10) Patent No.: US 11,734,851 B2
(45) Date of Patent: Aug. 22, 2023

(54) FACE KEY POINT DETECTION METHOD AND APPARATUS, STORAGE MEDIUM, AND ELECTRONIC DEVICE

(71) Applicant: TENCENT TECHNOLOGY (SHENZHEN) COMPANY LIMITED, Guangdong (CN)

(72) Inventors: Yi Tong Wang, Shenzhen (CN); Xing Ji, Shenzhen (CN); Zheng Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 367 days.

(21) Appl. No.: 17/240,085

(22) Filed: Apr. 26, 2021

(65) Prior Publication Data
US 2021/0248355 A1 Aug. 12, 2021

Related U.S. Application Data

(63) Continuation of application No. PCT/CN2020/080096, filed on Mar. 19, 2020.

(30) Foreign Application Priority Data

Apr. 2, 2019 (CN) .......................... 201910260404.7

(51) Int. Cl.
*G06N 3/08* (2023.01)
*G06T 7/73* (2017.01)
(Continued)

(52) U.S. Cl.
CPC .............. *G06T 7/73* (2017.01); *G06N 3/048* (2023.01); *G06N 3/08* (2013.01); *G06T 3/4046* (2013.01);
(Continued)

(58) Field of Classification Search
CPC ..... G06T 7/73; G06T 3/4046; G06T 2200/24; G06T 2207/10004; G06T 2207/20016;
(Continued)

(56) References Cited

U.S. PATENT DOCUMENTS 10,643,085 B1 * 5/2020 Kim .......................... G06T 7/60

FOREIGN PATENT DOCUMENTS

| CN | 108898087 A | 11/2018 |
| CN | 109492529 A | 3/2019 |

(Continued)

OTHER PUBLICATIONS

International Search Report for PCT/CN2020/080096 dated Jun. 11, 2020 [PCT/ISA/210].
(Continued)

*Primary Examiner* — Charlotte M Baker
(74) *Attorney, Agent, or Firm* — Sughrue Mion, PLLC

(57) ABSTRACT

A face key point detection method includes determining, according to an image containing a face, a multi-channel feature map of the image; converting the multi-channel feature map into a predetermined channel quantity of target feature maps; performing a convolution operation on each target feature map in the predetermined channel quantity of target feature maps by using a convolution kernel corresponding to each target feature map; generating a feature vector corresponding to the image based on a result of the convolution operation on each target feature map; and determining key point coordinates of the face on the image according to the feature vector.

20 Claims, 10 Drawing Sheets

(51) Int. Cl.
    *G06T 3/40*           (2006.01)
    *G06V 40/16*         (2022.01)
    *G06N 3/048*         (2023.01)
    *G06V 10/764*       (2022.01)
    *G06V 10/82*         (2022.01)

(52) U.S. Cl.
    CPC ............ G06V 10/764 (2022.01); G06V 10/82 (2022.01); G06V 40/171 (2022.01); G06V 40/172 (2022.01); *G06V 40/161* (2022.01)

(58) Field of Classification Search
    CPC . G06T 2207/20081; G06T 2207/20084; G06T 2207/30196; G06N 3/048; G06N 3/08; G06N 3/045; G06V 10/764; G06V 10/82; G06V 40/171; G06V 40/172; G06V 40/161; G06V 40/168
    USPC .......................................................... 382/181
    See application file for complete search history.

(56) References Cited

FOREIGN PATENT DOCUMENTS

| | | |
|---|---|---|
| CN | 110163080 A | 8/2019 |
| WO | 2016/026063 A1 | 2/2016 |

OTHER PUBLICATIONS

Written Opinion for PCT/CN2020/080096 dated Jun. 11, 2020 [PCT/ISA/237].

\* cited by examiner

FACE KEY POINT DETECTION METHOD AND APPARATUS, STORAGE MEDIUM, AND ELECTRONIC DEVICE

CROSS-REFERENCE TO RELATED APPLICATION(S)

This application is a bypass continuation application of International Application No. PCT/CN2020/080096, entitled "FACE KEY POINT DETECTION METHOD AND APPARATUS, AND STORAGE MEDIUM AND ELECTRONIC DEVICE" and filed Mar. 19, 2020, which claims priority to Chinese Patent Application No. 201910260404.7, entitled "FACE KEY POINT DETECTION METHOD AND APPARATUS, STORAGE MEDIUM, AND ELECTRONIC DEVICE", and filed with the China National Intellectual Property Administration on Apr. 2, 2019, the disclosures of which are herein incorporated by reference in their entireties.

FIELD

The disclosure relates to the field of image recognition technologies, and specifically, to face key point detection technologies.

BACKGROUND

Face key point detection is also referred to as face key point positioning, facial features positioning, or face alignment, and refers to the detection of facial key areas, including eyebrows, eyes, nose, mouth, face contour, and the like in a given face image. The face key point detection technology is the basic technology used in various computer application scenarios such as face dressing, beauty makeup, face special effects, and face augmented reality.

In the conventional face key point detection method, key point coordinates are determined by extracting manually designed features in local areas of the face and then performing cascaded regression. Due to the insufficient ability of manual feature discrimination, face key points predicted in this method often have low accuracy. Especially, under extreme face pose conditions, the prediction accuracy is poor.

Therefore, with the development of deep learning technologies, some face key point detection technologies based on deep learning have emerged. For example, a given face image is inputted, and face key point coordinates are obtained through regression by using a convolutional neural network. However, the current methods based on a convolutional neural network often require a large amount of computing. Consequently, the face key point detection cannot be easily applied to low-power devices.

The information disclosed in the background above is only used for enhancing the understanding of the background of the disclosure, and therefore may include information that does not constitute the related art known to a person of ordinary skill in the art.

SUMMARY

An objective of the disclosure is to provide a face key point detection method and apparatus, a storage medium, and an electronic device, to solve the problem in the related art that a large computing amount is required in a process of face key point detection.

According to an aspect of the disclosure, a face key point detection method is provided, performed by an electronic device, the method including: determining, according to an image containing a face, a multi-channel feature map of the image; converting the multi-channel feature map into a predetermined channel quantity of target feature maps; performing a convolution operation on each target feature map in the predetermined channel quantity of target feature maps by using a convolution kernel corresponding to each target feature map; generating a feature vector corresponding to the image based on a result of the convolution operation on each target feature map; and determining key point coordinates of the face on the image according to the feature vector.

According to an aspect of the disclosure, a face key point detection apparatus is provided, including at least one memory configured to store program code; and at least one processor configured to read the program code and operate as instructed by the program code. The program code includes: feature map determining code configured to cause at least one of the at least one processor to determine, according to an image containing a face, a multi-channel feature map of the image; feature map channel conversion code configured to cause at least one of the at least one processor to convert the multi-channel feature map into a predetermined channel quantity of target feature maps; global depthwise convolution code configured to cause at least one of the at least one processor to perform a convolution operation on each target feature map in the predetermined channel quantity of target feature maps by using a convolution kernel corresponding to each target feature map; feature vector generation code configured to cause at least one of the at least one processor to generate a feature vector corresponding to the image based on a result of the convolution operation on each target feature map; and key point determining code configured to cause at least one of the at least one processor to determine key point coordinates of the face on the image according to the feature vector.

In an example embodiment, in a process of performing one convolution operation, the convolution kernel has the same size as a corresponding feature map.

The feature map determining code is further configured to cause at least one of the at least one processor to perform downsampling on the image, to determine the multi-channel feature map of the image.

In an example embodiment, the feature map determining code is further configured to cause at least one of the at least one processor to perform a convolution operation on the image by using one convolution kernel or a plurality of cascaded convolution kernels, to perform downsampling on the image.

The feature map determining code is further configured to cause at least one of the at least one processor to perform a convolution operation on the image by using one convolution kernel or a plurality of cascaded convolution kernels, to generate an intermediate feature map; and perform one or more groups of dimensionality reduction convolution processes on the intermediate feature map, to perform downsampling on the image.

In an example embodiment, a dimensionality reduction convolution process of the one or more groups of dimensionality reduction convolution processes includes: performing, by using N convolution kernels with a size of a×a, a convolution operation on a feature map to be subject to the dimensionality reduction convolution, to generate a first feature map; performing a convolution operation on the first feature map by using M convolution kernels with a size of b×b, to generate a second feature map; performing a depthwise convolution operation on the second feature map by using M convolution kernels with a size of c×c, to generate a third feature map; performing a convolution operation on the third feature map by using N convolution kernels with a size of d×d, to generate a fourth feature map; and adding the first feature map and the fourth feature map channel by channel to obtain a result of the dimensionality reduction convolution, where a, b, c, d, N, and M are all positive integers, and N is less than M.

In an example embodiment, the feature map channel conversion code is further configured to cause at least one of the at least one processor to determine a quantity of convolution kernels with a size of 1×1 as a target quantity according to a channel quantity of the multi-channel feature map and the predetermined channel quantity; and perform a convolution operation with a stride of 1 on the multi-channel feature map by using the target quantity of convolution kernels with the size of 1×1, to determine the target feature map.

In an example embodiment, each of the convolution operation is performed by using a trained convolutional neural network.

In the face key point detection apparatus, the program code further includes network training code configured to cause at least one of the at least one processor to obtain an image sample, input the image sample into a convolutional neural network, calculate a loss function of the convolutional neural network, and converge the loss function of the convolutional neural network, to determine the trained convolutional neural network.

The network training code is configured to cause at least one of the at least one processor to obtain an original image containing a face; determine a sample with an occluding object according to the original image; obtain annotation information of the sample with an occluding object; and use the sample with an occluding object and the annotation information as the image sample.

In an example embodiment, the loss function of the convolutional neural network is calculated with reference to an occluding object loss function Loss$_{occlusion}$ represented by the following formula:

$$\text{Loss}_{occlusion} = \sum_{i=1}^{n} p_i \log(\text{sigmoid}(x_i)) + (1 - p_i)\log(1 - \text{sigmoid}(x_i))$$

where n represents a quantity of face key points; $p_i$ represents information about whether an $i^{th}$ key point is occluded, for example, if occluded, $p_i$ is 1, and if not occluded, $p_i$ is 0; and $x_i$ represents a feature outputted by the convolutional neural network.

BRIEF DESCRIPTION OF THE DRAWINGS

Accompanying drawings herein are incorporated into the specification and constitute a part of this specification, show example embodiments that conform to the disclosure, and are used for describing a principle of the disclosure together with this specification. Apparently, the accompanying drawings described below are merely some embodiments of the disclosure, and a person of ordinary skill in the art may further obtain other accompanying drawings according to the accompanying drawings without creative efforts.

DETAILED DESCRIPTION

The example implementations are described comprehensively with reference to the accompanying drawings. However, the examples of implementations may be implemented in a plurality of forms, and it is not to be understood as being limited to the examples described herein. Conversely, the implementations are provided to make the disclosure more comprehensive and complete, and comprehensively convey the idea of the examples of the implementations to a person skilled in the art. The described features, structures, or characteristics may be combined in one or more example implementations in any appropriate manner. In the following description, many specific details are provided to give a full understanding of the implementations of the disclosure. However, it is to be appreciated by a person skilled in the art that one or more of the specific details may be omitted during practice of the technical solutions of the disclosure, or other methods, components, apparatus, steps, or the like may be used. In other cases, well-known technical solutions are not shown or described in detail in order to avoid overwhelming the subject and thus obscuring various aspects of the disclosure.

In addition, the accompanying drawings are only schematic illustrations of the disclosure and are not necessarily drawn to scale. The same reference numbers in the accompanying drawings represent the same or similar parts, and therefore, repeated descriptions thereof are omitted. Some of the block diagrams shown in the accompanying drawings are functional entities and do not necessarily correspond to physically or logically independent entities. Such functional entities may be implemented in the form of software, or implemented in one or more hardware modules or integrated circuits, or implemented in different networks and/or processor apparatuses and/or micro-controller apparatuses.

The flowcharts shown in the accompanying drawings are merely example descriptions and do not necessarily include all operations. For example, some operations may further be decomposed, and some operations may be merged or partially merged. As a result, an actual execution order may be changed according to an actual situation. In addition, the terms "first", "second", "third", and "fourth" used below are only for the purpose of distinguishing, and are not to be a limitation of the content described in the disclosure.

Figure 1:
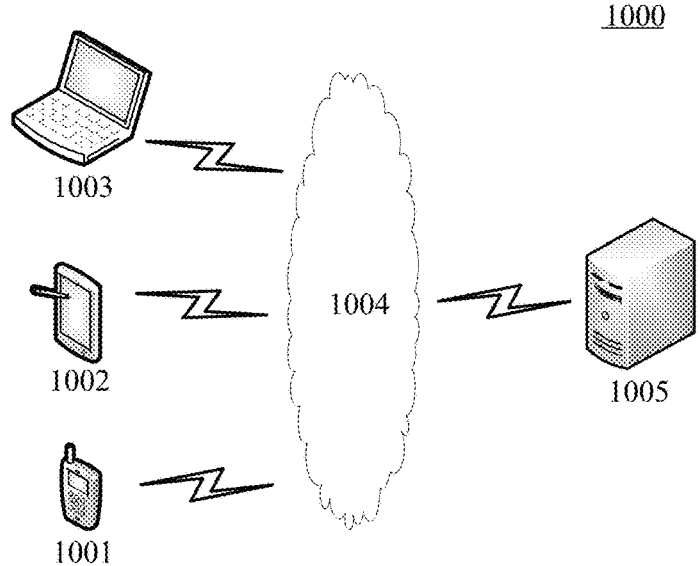
FIG. 1 is a schematic diagram of an example system architecture to which a face key point detection method or a face key point detection apparatus according to an embodiment of the disclosure may be applied.

FIG. 1 is a schematic diagram of an example system architecture to which a face key point detection method or a face key point detection apparatus according to an embodiment of the disclosure may be applied.

As shown in FIG. 1, a system architecture 1000 may include one or more of terminal devices 1001, 1002, and 1003, a network 1004, and a server 1005. The network 1004 is configured to provide a medium of communication links between the terminal devices 1001, 1002, and 1003, and the server 1005. The network 1004 may include various connection types, for example, a wired or wireless communication link, or an optical fiber cable.

It is to be understood that the quantity of terminal devices, the quantity of networks, and the quantity of servers in FIG. 1 are merely illustrative. There may be any quantity of terminal devices, any quantity of networks, and any quantity of servers according to an implementation requirement. For example, the server 1005 may be a server cluster including a plurality of servers or the like.

A user may interact with the server 1005 through the network 1004 by using the terminal devices 1001, 1002, and 1003, to receive or send messages. The terminal devices 1001, 1002, and 1003 may be various electronic devices having display screens, including but not limited to a smartphone, a tablet computer, a portable computer, a desktop computer, or the like.

The server 1005 may be a server providing various services. For example, the server 1005 may obtain an image containing a face from the terminal devices 1001, 1002, and 1003, generate a multi-channel feature map according to the image containing a face, convert the multi-channel feature map into a predetermined channel quantity of target feature maps, and then separately perform one convolution operation on each target feature map, to generate a feature vector, and determine key point coordinates of the face on the image according to the feature vector. In this case, the face key point detection apparatus described in the disclosure is generally disposed in the server 1005.

In addition, it is to be understood that the face key point detection method according to the example implementations of the disclosure has a small computing amount, and the terminal devices 1001, 1002, and 1003 may directly perform the following face key point detection method. In this case, the face key point detection apparatus described in the disclosure may be disposed in the terminal devices 1001, 1002, and 1003.

Figure 2:
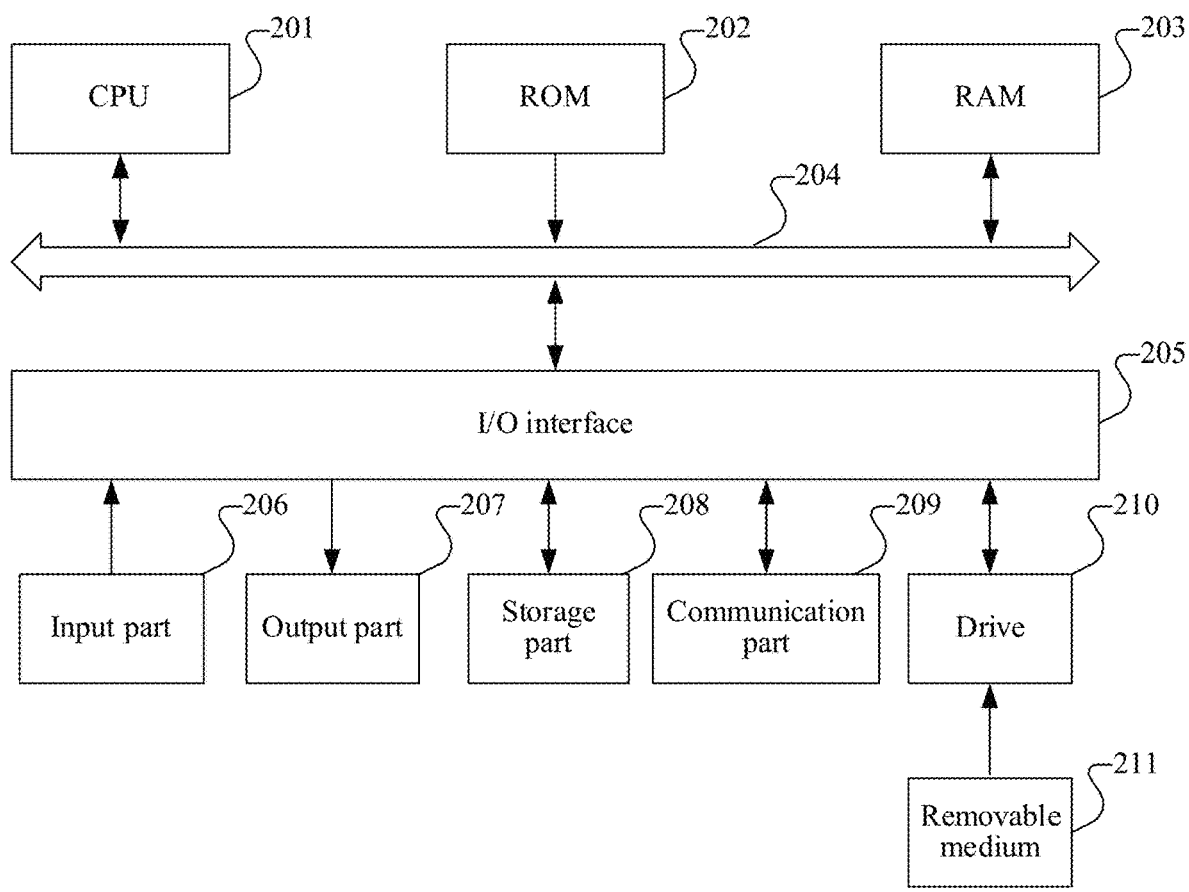
FIG. 2 is a schematic structural diagram of a computer system adapted to implement an electronic device according to an embodiment of the disclosure.

FIG. 2 is a schematic structural diagram of a computer system adapted to implement an electronic device according to an embodiment of the disclosure.

A computer system 200 of the electronic device shown in FIG. 2 is merely an example, and does not constitute any limitation on functions and use ranges of the embodiments of the disclosure.

As shown in FIG. 2, the computer system 200 includes a central processing unit (CPU) 201, which may perform various appropriate actions and processing according to a program stored in a read-only memory (ROM) 202 or a program loaded into a random access memory (RAM) 203 from a storage part 208. The RAM 203 further stores various programs and data required for operating the system. The CPU 201, the ROM 202, and the RAM 203 are connected to each other by using a bus 204. An input/output (I/O) interface 205 is also connected to the bus 204.

The following components are connected to the I/O interface 205: an input part (or input interface) 206 including a keyboard, a mouse, or the like, an output part (or output interface) 207 including a cathode ray tube (CRT), a liquid crystal display (LCD), a speaker, or the like, a storage part 208 including a hard disk, or the like, and a communication part 209 including a network interface card such as a local area network (LAN) card or a modem. The communication part 209 performs communication processing by using a network such as the Internet. A drive (or driver) 210 is also connected to the I/O interface 205 as needed. A removable medium 211, such as a magnetic disk, an optical disc, a magneto-optical disk, or a semiconductor memory, is installed on the drive 210 as required, so that a computer program read from the removable medium is installed into the storage part 208 as required.

Particularly, according to an embodiment of the disclosure, the processes described in the following by referring to the flowcharts may be implemented as computer software programs. For example, an example embodiment of the disclosure includes a computer program product, the computer program product includes a computer program carried on a computer-readable medium, and the computer program includes program code used for performing the methods shown in the flowcharts. In such an embodiment, by using the communication part 209, the computer program may be downloaded and installed from a network, and/or installed from the removable medium 211. When the computer program is executed by the CPU 201, the various functions defined in the system of the disclosure are executed.

The computer-readable medium shown in the disclosure may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM or a flash memory), an optical fiber, a compact disk read-only memory (CD-ROM), an optical storage device, a magnetic storage device, or any appropriate combination thereof. In the disclosure, the computer-readable storage medium may be any tangible medium containing or storing a program, and the program may be used by or used in combination with an instruction execution system, an apparatus, or a device. In the disclosure, a computer-readable signal medium may include a data signal being in a baseband or propagated as a part of a carrier wave, the data signal carrying computer-readable program code. A data signal propagated in such a way may assume a plurality of forms, including, but not limited to, an electromagnetic signal, an optical signal, or any appropriate combination thereof. The computer-readable signal medium may be further any computer readable medium in addition to a computer-readable storage medium. The computer readable medium may send, propagate, or transmit a program that is used by or used in conjunction with an instruction execution system, an apparatus, or a device. The program code included in the computer-readable medium may be transmitted by using any suitable medium, including but not limited to: wireless transmission, a wire, a cable, radio frequency (RF) or the like, or any other suitable combination thereof.

The flowcharts and block diagrams in the accompanying drawings illustrate possible system architectures, functions and operations that may be implemented by a system, a method, and a computer program product according to various embodiments of the disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, operations shown in succession in the flowchart may be performed basically in parallel, and or may be performed in a reverse sequence. The order of operations may be determined by a related function. It is also to be noted that, each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of the disclosure may be implemented in a software manner, or may be implemented in a hardware manner, and the unit described may also be set in a processor. Names of the units do not constitute a limitation on the units in a specific case.

According to another aspect, the disclosure further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the following embodiments.

By detecting face key points, computerized operations such as face dressing, beauty makeup, face special effects, and face augmented reality (AR) may be further implemented. It may be seen that the detection of face key points has a wide range of technical application prospects.

Figure 3:
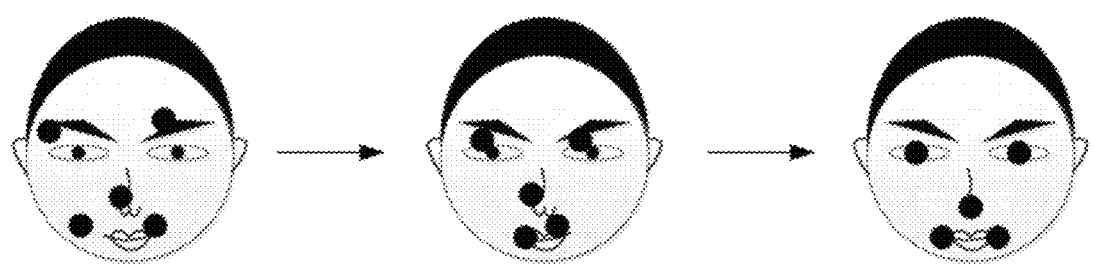
FIG. 3 is a schematic diagram of a technology of determining face key points in combination with manual designs.

In some face key point detection technologies, key point coordinates are determined by extracting manually designed features in local areas of the face and then performing cascaded regression. The technologies used include, for example, a local binary features (LBF) algorithm. As shown in FIG. 3, a main process of such a method generally includes: first, manually designing a group of initial face key point coordinates; then, extracting features in the neighborhood of each key point coordinate; next, performing regression calculation on the group of features to obtain face key point coordinates of a new image, and iterating the foregoing process continuously.

Such a face key point detection algorithm that combines manually added features with cascaded regression has relatively low algorithm complexity, and is easily implemented on low-power devices such as mobile phones. However, due to the insufficient ability of manual feature discrimination, predicted face key points often have inadequate accuracy, and especially under extreme face pose conditions, results of face key point prediction are undesirable.

Figure 4:
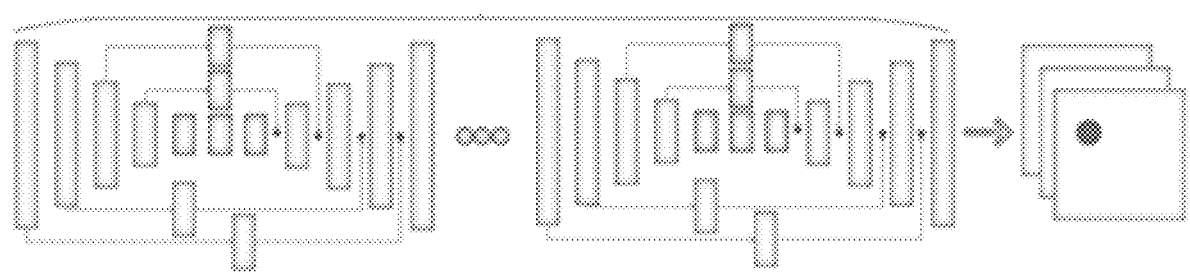
FIG. 4 is a schematic diagram of some technologies of implementing face key point detection by using a convolutional neural network.

In another type of face key point detection technologies, a convolutional neural network (CNN) is used to implement the face key point detection. In one approach using this technology, a given face image is inputted into a convolutional neural network, and face key point coordinates are directly obtained through regression by using the convolutional neural network. In another approach using this technology, as shown in FIG. 4, a feature map corresponding to each face key point is obtained through regression by using a convolutional neural network, where a larger feature value in each feature map indicates a higher response, and a location with the highest response represents a location of the corresponding face key point.

The existing methods of predicting face key points based on a convolutional neural network have a relatively large computing amount, which makes it unsuitable for application to low-power devices.

In view of this, the embodiments of the disclosure provide a face key point detection method. The method uses a depthwise convolution manner, which may reduce a computing amount of determining key point coordinates while ensuring accurate extraction of face key point information. In addition, the face key point detection method described in the disclosure has a relatively small computing amount, and thus may be better applied to low-power devices.

The method provided in the embodiments of the disclosure may be implemented by using artificial intelligence technologies. Artificial Intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result. The AI technology is a comprehensive discipline, relating to a wide range of fields including both hardware-level technologies and software-level technologies. The basic AI technologies generally include technologies such as sensors, dedicated AI chips, cloud computing, distributed storage, big data processing, operating/interaction systems, and electromechanical integration. AI software technologies mainly include several major directions such as a computer vision (CV) technology, a speech processing technology, a natural language processing technology, and machine learning/deep learning.

The methods provided in the embodiments of the disclosure mainly relate to computer vision, and machine learning/deep learning. Computer vision (CV) is a science that studies how to enable a machine to "see", and to be specific, to implement machine vision such as recognition, tracking, measurement, and the like for a target by using a camera and a computer in replacement of human eyes, and further perform graphic processing, so that the computer processes the target into an image more suitable for human eyes to observe, or more suitable to be transmitted to an instrument for detection. CV normally includes technologies such as image processing, image recognition, video processing, virtual reality, and augmented reality. For example, image processing and image recognition technologies are used to identify and obtain an image containing a face.

Machine learning (ML) is a multi-field interdiscipline, relating to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML and deep learning generally include technologies such as artificial neural networks, belief networks, reinforcement learning, transfer learning, inductive learning, and learning from demonstrations. For example, through ML, a convolutional neural network model may be trained for face key point detection.

Figure 5:
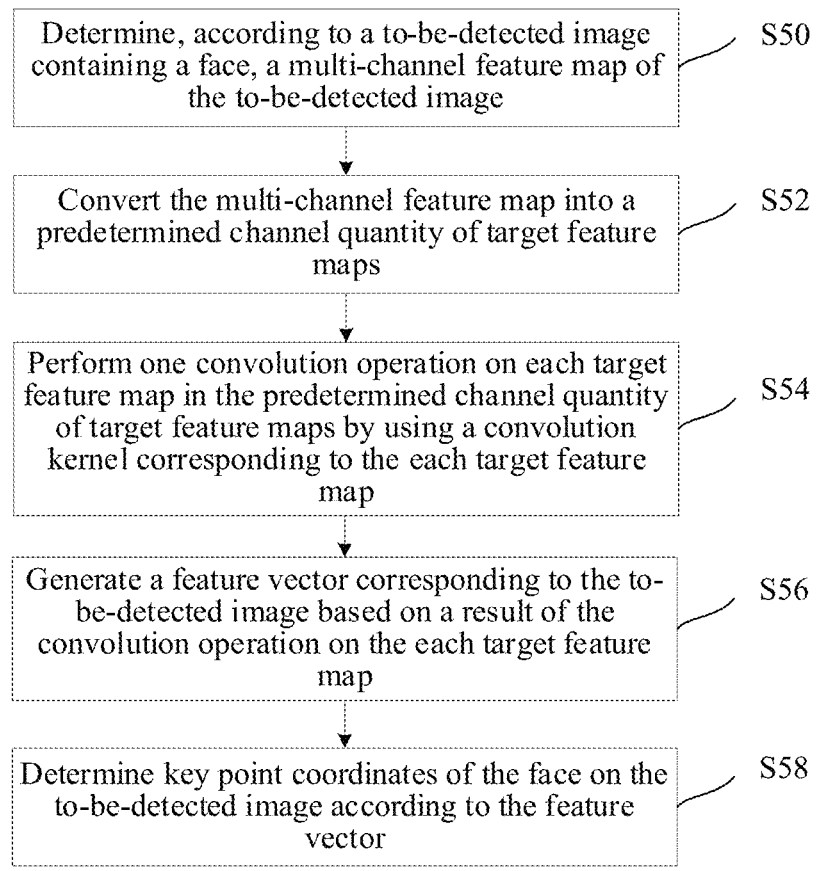
FIG. 5 is a schematic flowchart of a face key point detection method according to an example implementation of the disclosure.

FIG. 5 is a schematic flowchart of a face key point detection method according to an example implementation of the disclosure. Referring to FIG. 5, the face key point detection method may include the following operations S50-S58:

S50. Determine, according to an image (e.g., a to-be-detected image of which face key points are to be detected) containing a face, a multi-channel feature map of the image.

In an example embodiment of the disclosure, images may include face key points, which are to be determined, and these images may be, for example, images to which face special effects are to be added and/or images on which a face AR operation is to be performed. In addition, the images may be real-time images photographed by a terminal device, or may be video frame images extracted from an existing video. The disclosure does not impose particular limitations on the resolution, image background, face pose, quantity of faces, image color temperature, and the like of the image.

According to some embodiments of the disclosure, the image in S50 is an image containing a face, but the obtained images do not necessarily contain a face. Therefore, to ensure that an image containing a face is obtained, a face key point detection method is performed on the image. The face key point detection method of the disclosure may further include recognizing the obtained image, to ensure that the image contains a face. For example, a supervised machine learning model may be used to recognize images to ensure that the server obtains the image containing a face.

According to some embodiments of the disclosure, after the image is obtained, a feature map corresponding to the image is determined as the multi-channel feature map described in operation S50.

According to some embodiments of the disclosure, after the image is obtained, an implementation of S50 may include an operation to perform downsampling on the image, to generate the multi-channel feature map corresponding to the image.

Downsampling, also known as decimation, may be understood as obtaining a second set from a first set according to certain rules, where data elements in the second set are less than data elements in the first set. The downsampling of an image may refer to extracting image features from the image according to certain rules. In a process of processing an image into the form of a feature map, the downsampling may be understood as extracting features from a feature map of an original image according to certain rules, to construct a smaller feature map.

Generally, a downsampling process of an image may be implemented by using an interpolation algorithm. Interpolation algorithms may include but are not limited to nearest neighbor interpolation, bilinear interpolation, mean interpolation, intermediate interpolation, and other algorithms.

In addition, in an example embodiment of the disclosure, a convolution operation may be performed on the image to implement the downsampling process of the image, to determine the multi-channel feature map corresponding to the image. The convolution operation refers to a process of performing multiplication by using convolution kernels. The convolution operation means performing convolution on a convolution kernel and a corresponding region of the image feature map to obtain a value, and then continuously moving the convolution kernel and performing convolution, to complete the convolution of the entire image feature map.

According to an embodiment of the disclosure, a convolution operation may be performed on the image by using one convolution kernel, and a result of the convolution operation is determined as the multi-channel feature map corresponding to the image. The disclosure does not impose particular limitations on a size of the convolution kernel and a stride of the convolution operation. Developers may determine the size of the convolution kernel and the stride of the convolution operation by comprehensively considering the computing amount and fineness, to achieve a better face key point detection effect.

According to some other embodiments of the disclosure, a plurality of cascaded convolution kernels may be used to perform a convolution operation on the image, and a result of the convolution operation is determined as the multi-channel feature map corresponding to the image.

Compared with the downsampling using only one convolution kernel, the downsampling using a plurality of convolution kernels may further reduce the computing complexity of subsequent face key point detection.

According to some other embodiments of the disclosure, the downsampling may be further performed based on the foregoing two embodiments, to determine the multi-channel feature map corresponding to the image.

For example, first, a convolution operation may be performed on the image by using one convolution kernel or a plurality of cascaded convolution kernels, to generate an intermediate feature map; then, one or more groups of dimensionality reduction convolution processes are performed on the intermediate feature map to implement downsampling on the image, to determine the multi-channel feature map corresponding to the image.

For each group of dimensionality reduction convolution processes, first, a convolution operation may be performed on a feature map to be subject to the dimensionality reduction convolution by using N convolution kernels with a size of a×a, to generate a first feature map. The feature map to be subject to the dimensionality reduction convolution is an inputted feature map for the group of dimensionality reduction convolutions. It would be understood that when the intermediate feature map is processed by using only one group of dimensionality reduction convolution processes, the feature map to be subject to the dimensionality reduction convolution is the intermediate feature map. In a case that the intermediate feature map is processed by using a plurality of groups of cascaded dimensionality reduction convolution processes, a feature map to be subject to the dimensionality reduction convolution corresponding to the first group of convolution processes is the intermediate feature map, and the feature map to be subject to the dimensionality reduction convolution corresponding to each of other groups of convolution processes is a feature map outputted by a previous group of cascaded convolution processes.

Next, a convolution operation may be performed on the first feature map by using M convolution kernels with a size of b×b, to generate a second feature map. Subsequently, a depthwise (DW) convolution operation may be performed on the second feature map by using M convolution kernels with a size of c×c, to generate a third feature map. Then, a convolution operation may be performed on the third feature map by using N convolution kernels with a size of d×d, to generate a fourth feature map. After the first feature map and the fourth feature map are obtained, the first feature map and the fourth feature map may be added channel by channel, to obtain a result of the dimensionality reduction convolution. a, b, c, d, N, and M are all positive integers, and N is generally less than M.

It is to be understood that the foregoing parameters a, b, c, d, N, and M may be manually determined by the developers by comprehensively considering the computing amount and fineness, and are not specifically limited in this example embodiment.

In the dimensionality reduction convolution process, ordinary convolution and depthwise convolution are used. For the ordinary convolution, each convolution kernel operates all channels of the image at the same time; while for the depthwise convolution, one convolution kernel is responsible for one channel, that is, one channel of the image is convolved by only one convolution kernel. Therefore, it can be seen that the combination of the ordinary convolution and the depthwise convolution may effectively reduce the computing complexity while ensuring feature extraction.

S52. Convert the multi-channel feature map into a predetermined channel quantity of target feature maps.

After the multi-channel feature map is determined in operation S50, the multi-channel feature map may be converted into the predetermined channel quantity of target feature maps. The predetermined channel quantity is manually determined, and is the same as the quantity of convolution kernels in the subsequent depthwise convolution operation.

In this embodiment, various manners may be used to convert the multi-channel feature map into the target feature maps. In some possible implementations, first, a quantity of convolution kernels with a size of 1×1 may be determined as a target quantity according to a channel quantity of the multi-channel feature map and the predetermined channel quantity. For example, a product of the channel quantity of the multi-channel feature map and the predetermined channel quantity may be used as the target quantity.

Next, a convolution operation with a stride of 1 may be performed on the multi-channel feature map by using the target quantity of convolution kernels with a size of 1×1, to determine the predetermined channel quantity of target feature maps. The convolution operation with the convolution kernel size of 1×1 and the stride of 1 is normally an upscaling operation, that is, the predetermined channel quantity is greater than the channel quantity of the inputted multi-channel feature map. Therefore, the robustness of features may be improved.

For example, a multi-channel feature map may be expressed as an H×W×C feature map, where H, W, and C represent the height, width, and channel quantity of the feature map respectively. The quantity of the 1×1 convolution kernels is C×D, where D is the predetermined channel quantity. In this case, after convolution, the multi-channel feature map may be converted into H×W×D target feature maps.

S54. Perform one convolution operation on each target feature map in the predetermined channel quantity of target feature maps by using a convolution kernel corresponding to each target feature map.

In an example embodiment of the disclosure, the convolution kernel used for one convolution operation in operation S54 has the same size as the feature map. For example, if the size of each target feature map is 28×28, the size of the convolution kernel used in one convolution operation is also 28×28.

One convolution operation is performed on each target feature map in the predetermined channel quantity of target feature maps. In the convolution operation, a convolution kernel with the same size as the target feature map may be used to perform the convolution operation. Certainly, a convolution kernel with a different size from that of the target feature map may alternatively be used to perform the convolution operation. This is not limited in this embodiment of the disclosure. In addition, for different target feature maps, weights of the corresponding convolution kernels may be different.

S56. Generate a feature vector corresponding to the image based on a result of the convolution operation on each target feature map.

After the convolution in operation S54 is performed on each target feature map, the feature vector corresponding to the image may be determined.

For example, if the predetermined channel quantity is 512, after one convolution operation is performed on each target feature map by using a convolution kernel with the same size as the feature map, a resulting feature vector of 1×1×512 is obtained.

S58. Determine key point coordinates of the face on the image according to the feature vector.

In an example embodiment of the disclosure, feature extraction and combination operations may be further performed on the feature vector generated in operation S56, and a determined feature may be mapped to the key point coordinates of the face.

For example, first, features of an eye area image may be determined from the feature vector. For example, historical images may be analyzed to manually determine features of the eye area image, and the features may be stored in a feature database. After the feature vector of the image is determined, similarity comparison may be performed on features in the feature vector and features in the feature database. If a similarity is greater than a similarity threshold, it is determined that these features in the feature vector correspond to the features of the eye area image. Next, a position of these features in the feature vector on the image may be determined as a position of the eye area.

In addition, the key point coordinates of the face may alternatively be determined from the feature vector by using fully-connected processing of the convolutional neural network. Still using 512-dimensional features as an example, through a fully-connected feature combination process, 136-dimensional feature data may be directly outputted, which corresponds to horizontal and vertical coordinates of 68 face key points in the image.

In summary, according to the face key point detection method provided in the example embodiments of the disclosure, the image may be converted into a lower-resolution image by performing downsampling on the image, to reduce the complexity of subsequent image processing. By using corresponding convolution kernels, one-convolution processes are performed on the multi-channel feature map determined after the downsampling, which improves the robustness of features while preserving spatial structure information of the face, and reduces a parameter quantity and the computing complexity, thus reducing the computing amount of determining the key point coordinates subsequently. In addition, the face key point detection method described in the disclosure has a relatively small computing amount, and thus may be better applied to low-power devices.

In an embodiment of the disclosure, a convolutional neural network may be used to perform the foregoing convolution operations, that is, the face key point detection method may be implemented based on the convolutional neural network.

Figure 6:
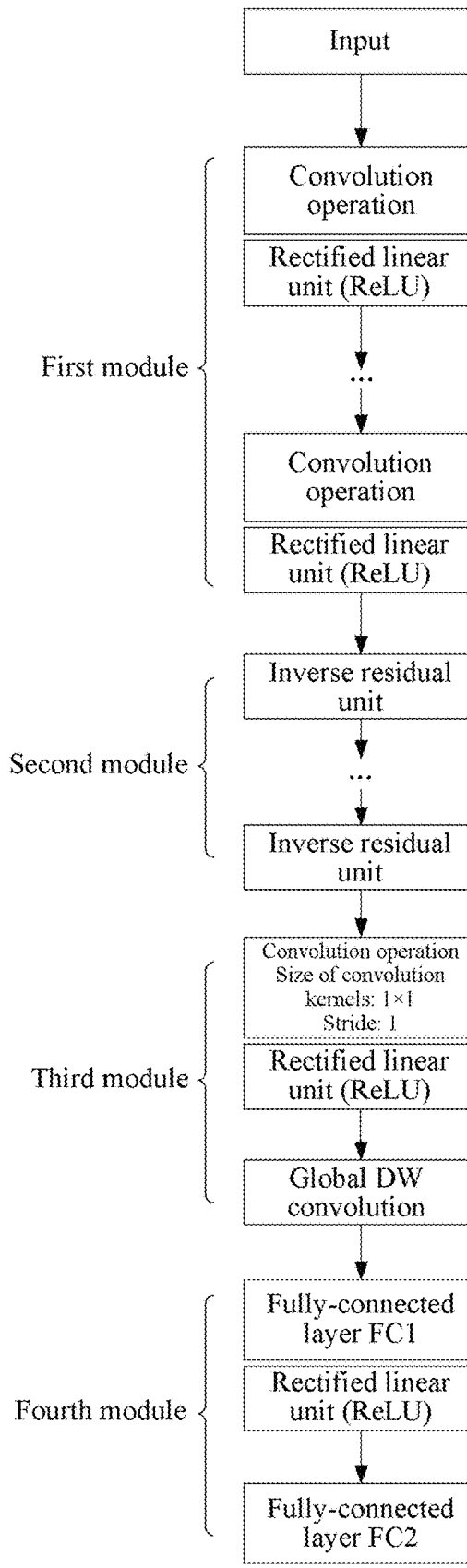
FIG. 6 is a schematic structural diagram of a convolutional neural network according to an example implementation of the disclosure.

Referring to FIG. 6, a convolutional neural network constructed based on the concept of the disclosure may include a first module, a second module, a third module, and a fourth module.

The first module may perform first-stage downsampling on an inputted image, to extract low-level features; the second module may perform second-stage downsampling, to extract high-level features; the third module may perform a convolution operation on the features outputted by the second module, to generate a feature vector of the image; and the fourth module may map the determined feature vector to face key point coordinates by using a fully-connected layer.

The modules in the convolutional neural network are described separately below.

The first module may use one convolution kernel or a plurality of cascaded convolution kernels to perform convolution operations on the image. After each convolution operation, a result is processed by using a rectified linear unit (ReLU), to enhance the sparsity of the network.

In some embodiments, the low-level features extracted by the first module may include, for example, a contour of facial lines in the image and gray level intensity of each pixel.

The developers may comprehensively consider the computing complexity of the network and the accuracy of the prediction, to determine parameters of the convolution operation in the first module. The parameters are not specifically limited in this example embodiment.

The second module may use one or more inverted residual units to further perform downsampling on a feature map outputted by the first module.

Figure 7:
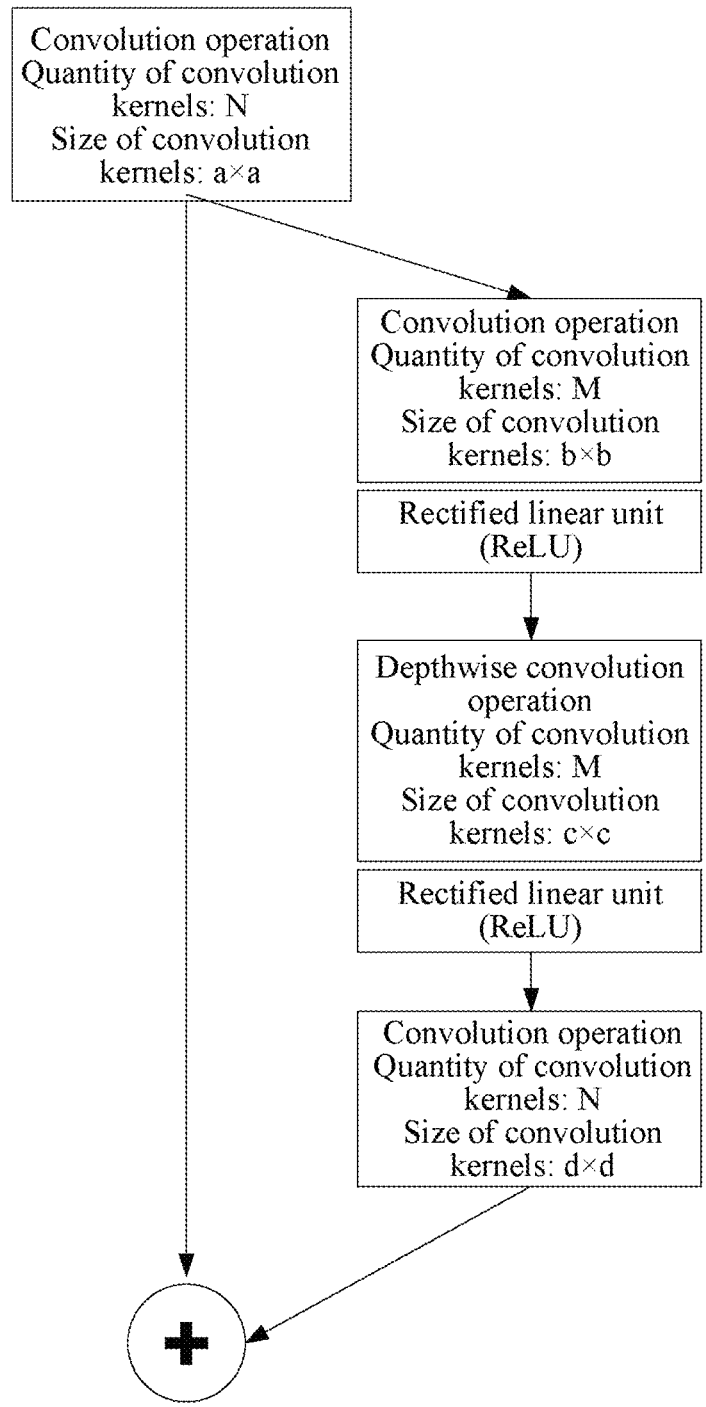
FIG. 7 is a schematic structural diagram of an inverse residual unit in a convolutional neural network according to an example implementation of the disclosure.

Referring to FIG. 7, each inverted residual unit may perform the following processing: first, a convolution operation may be performed, by using N convolution kernels with a size of a×a, on a feature map to be subject to inverted residual processing, to generate a first feature map, where the feature map to be processed is a feature map inputted for the group of dimensionality reduction convolutions; next, a convolution operation may be performed on the first feature map by using M convolution kernels with a size of b×b, to generate a second feature map; subsequently, a depthwise convolution operation may be performed on the second feature map by using M convolution kernels with a size of c×c, to generate a third feature map; then, a convolution operation may be performed on the third feature map by using N convolution kernels with a size of d×d, to generate a fourth feature map. After the first feature map and the fourth feature map are obtained, the first feature map and the fourth feature map may be added channel by channel, to obtain a result of the dimensionality reduction convolution. a, b, c, d, N, and M are all positive integers, and N is generally less than M.

In some embodiments, the high-level features extracted by the second module may include, for example, morphological information of facial features in the image.

Through the inverse residual unit, the nonlinearity and depth of the network are increased, and the fitting ability of the network is improved. In addition, based on the downsampling of the second module, the computing complexity of the entire network is further reduced.

The third module includes a convolution operation and a global depthwise convolution (global DW convolution) operation. By using convolution kernels with a size of 1×1, a convolution operation with a stride of 1 is performed on the feature map outputted by the second module, to convert a channel quantity of the inputted feature map into a channel quantity required for the global DW convolution operation.

Figure 8:
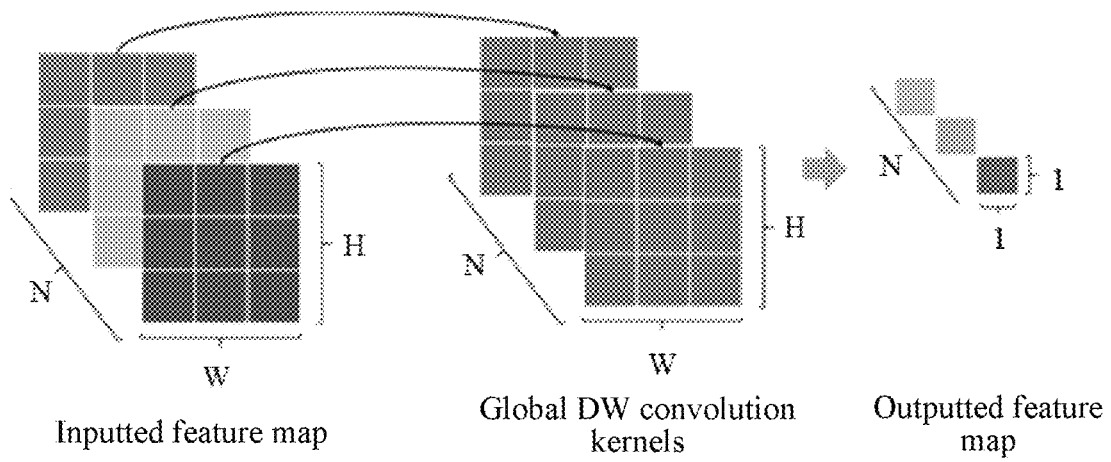
FIG. 8 is a schematic diagram of an implementation principle of global depthwise (DW) convolution in a convolutional neural network according to an example implementation of the disclosure.

The principle of the global DW convolution is illustrated with reference to FIG. 8. The size and quantity of the convolution kernels used in the global DW convolution are respectively the same as the size and the channel quantity of the inputted feature map. Therefore, the feature vector of the image may be determined.

By using global DW convolution, the complexity and parameter quantity of the network are greatly reduced. Because the global DW convolution is a depthwise convolution, it may retain the global information of the facial features to a certain extent. In addition, the generation of the feature vector reduces the computing amount for subsequent full connections.

The fourth module includes two fully-connected layers. Through feature extraction operations of the two fully-connected layers, the feature vector outputted by the third module is mapped to face key point coordinates.

An example implementation of the disclosure further provides a solution for training the foregoing convolutional neural network. The entire training process may be described as follows: obtaining an image sample, inputting the image sample into the convolutional neural network, calculating a loss function of the convolutional neural network, and converging the loss function of the convolutional neural network, to determine the trained convolutional neural network.

For the process of obtaining the image sample, in addition to normal images containing a face, in an example implementation of the disclosure, images with an occluding object may further be obtained as training samples.

Figure 9:
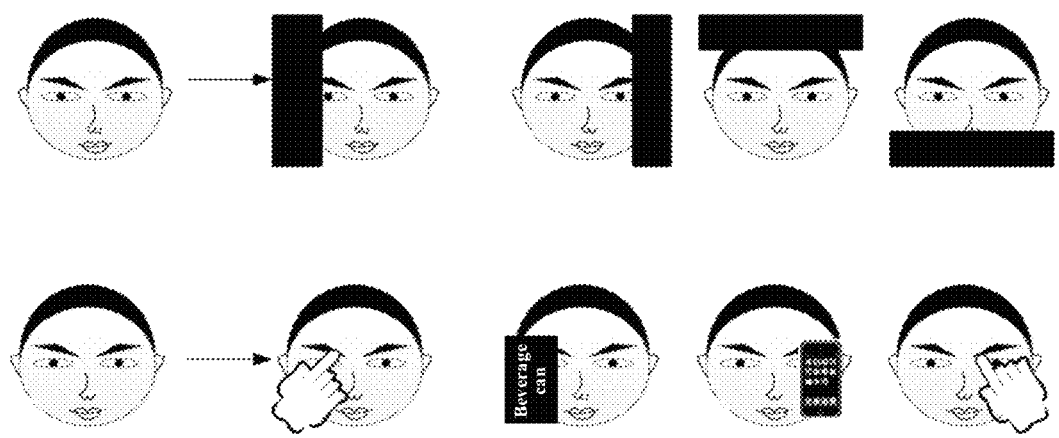
FIG. 9 is a schematic diagram of determining an image sample according to an example implementation of the disclosure.

Referring to FIG. 9, first, an original image containing a face may be obtained. It is to be understood that the disclosure does not impose particular limitations on the resolution, image background, face pose, quantity of faces, image color temperature, and the like of the original image.

Next, an occluding object may be added to the original image to determine a sample with an occluding object. For example, the occluding object may be a black rectangle randomly added on the image by using image processing software (for example, Photoshop), to simulate a case in which a face does not appear completely within a visible range of a camera. However, it is to be understood that the disclosure does not impose particular limitations on the color and shape of the occluding object in this case, for example, the occluding object may alternatively be a white circle, or a yellow triangle; and in another example, the occluding object may alternatively be a common object in reality (for example, a hand, a beverage can, or a mobile phone), to simulate a case in which the face is occluded by a common object.

Subsequently, annotation information may be manually added to the sample with an occluding object. In this way, the annotation information of the sample with an occluding object may be obtained, so that the sample with an occluding object and the annotation information are used as an image sample for the training of the convolutional neural network.

In a case of continuously inputting image samples into the convolutional neural network, the loss function of the convolutional neural network is calculated with reference to an occluding object loss function Loss$_{occlusion}$ represented by the following formula:

$$\text{Loss}_{occlusion} = \sum_{i=1}^{n} p_i \log(\text{sigmoid}(x_i)) + (1 - p_i)\log(1 - \text{sigmoid}(x_i))$$

where n represents a quantity of face key points; $p_i$ represents information about whether an $i^{th}$ key point is occluded; and $x_i$ represents a feature outputted by the convolutional neural network. In some implementations, if occluded, $p_i$ is 1, and if not occluded, $p_i$ is 0.

A person skilled in the art would understand that the sigmoid function may be expressed as:

$$\text{sigmoid}(x_i) = \frac{1}{1 + e^{x_i}}$$

The loss function may alternatively be referred to as a cost function, which is a function that maps a value of a random event or a related random variable thereof to a non-negative real number to represent the risk or loss of the random event. The occluding object loss function constructed in the disclosure may be used for adjusting the parameters in the convolutional neural network according to an error between actually marked occluding object information and occluding object information predicted by the convolutional neural network.

In addition to the foregoing occluding object loss function, the loss function of the convolutional neural network in this embodiment of the disclosure further includes other types of loss functions, for example, distance loss function, and information entropy loss function. The loss function of the convolutional neural network may be determined by combining such functions.

The convolutional neural network is trained based on the image sample with an occluding object and the occluding object constructed loss function, which not only improves the generalization of the entire network, but also makes the network more versatile.

Figure 10:
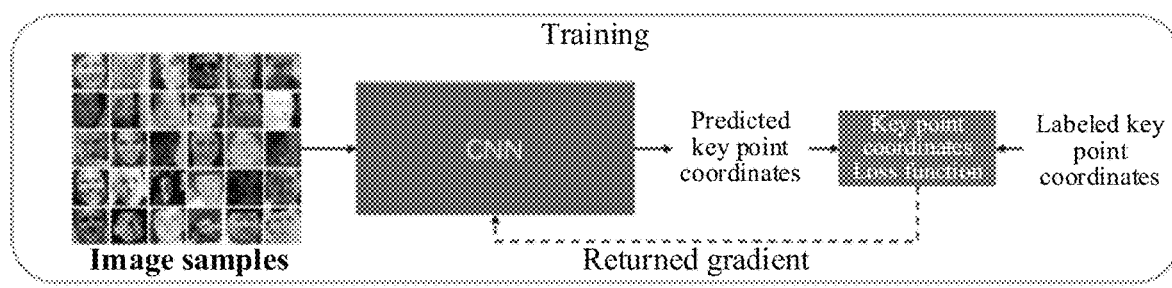
FIG. 10 is a schematic diagram of training a convolutional neural network according to an example implementation of the disclosure.

FIG. 10 is a schematic diagram of training a convolutional neural network according to an example implementation of the disclosure.

For example, first, an image sample is inputted into a CNN network to obtain predicted key point coordinates; next, the predicted key point coordinates and pre-labeled key point coordinates are used to calculate a loss function of the CNN network, and a gradient is returned to parameters in the CNN network according to a calculation result, to adjust the parameters. This process is iterated until the loss function reaches a minimum value, that is, the loss function tends to be stable, and then the training process may be ended.

Figure 11:
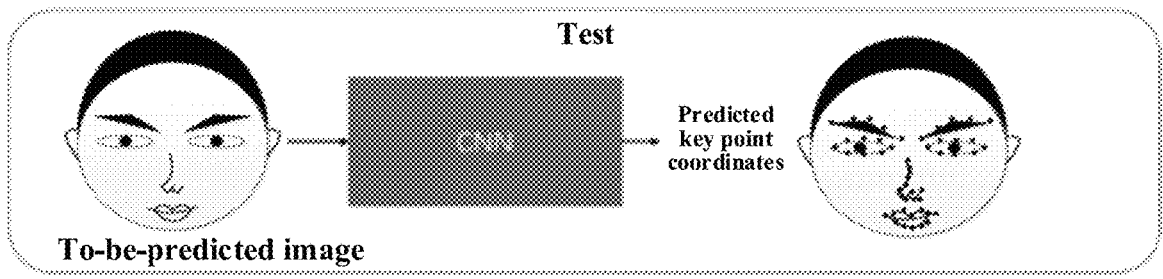
FIG. 11 is a schematic diagram of detecting face key points by using a convolutional neural network according to an example implementation of the disclosure.

FIG. 11 is a schematic diagram of detecting face key points by using a convolutional neural network according to an example implementation of the disclosure.

An image (or referred to as a to-be-detected image or to-be-predicted image) is inputted into a trained CNN network, to directly determine face key point coordinates on the image.

A three-channel (RGB, red, green, and blue) image with a size of 224×224 and containing a face is used as an example, to illustrate the face key point detection method according to an example implementation of the disclosure. The image may be expressed as 224×224×3, where 224×224 represents the image size, and 3 represents a channel quantity.

Referring to FIG. 6, in the first module of the convolutional neural network, a convolution kernel with a size of 3×3 and a channel quantity of 16 may be used to perform a convolution operation with a stride of 2 on the image. A feature map outputted in this operation is 112×112×16.

Next, a convolution kernel with a size of 3×3 and a channel quantity of 32 may be used to perform a convolution operation with a stride of 2 on the 112×112×16 feature map to output a 56×56×32 feature map. It can be seen that the 56×56×32 feature map is the intermediate feature map described above.

In a case in which the convolutional neural network only uses one inverse residual unit to form the second module, that is, in a case in which only one group of dimensionality reduction convolutions is performed on the intermediate feature map, referring to FIGS. 7, a, b, c, d, N, and M may be set to 3, 1, 3, 1, 64, and 128 respectively. In addition, the stride of the convolution operation corresponding to the convolution kernel size a×a is 2, and the stride of all remaining convolution operations in FIG. 7 is set to 1.

First, a convolution kernel with a size of 3×3 and a channel quantity of 64 is used to perform a convolution operation with a stride of 2 on the 56×56×32 feature map to output a 28×28×64 feature map, that is, the foregoing first feature map.

Next, a convolution kernel with a size of 1×1 and a channel quantity of 128 is used to perform a convolution operation with a stride of 1 on the first feature map to output a 28×28×128 feature map, that is, the foregoing second feature map.

Subsequently, a convolution kernel with a size of 3×3 and a channel quantity of 128 is used to perform a depthwise convolution operation with a stride of 1 on the second feature map to output a 28×28×128 feature map, that is, the foregoing third feature map.

Then, a convolution kernel with a size of 1×1 and a channel quantity of 64 is used to perform a convolution operation with a stride of 1 on the third feature map to output a 28×28×64 feature map, that is, the foregoing fourth feature map.

After being determined, the first feature map and the fourth feature map are added channel by channel, and the 28×28×64 feature map is outputted as an input of the third module, that is, a target feature map.

In the third module of the convolutional neural network, first, a convolution kernel with a size of 1×1 and a channel quantity of 64×512 is used to perform a convolution operation on the 28×28×64 target feature map to output a 28×28×512 feature map.

Next, a global DW convolution operation is performed on the 28×28×512 feature map, to output a 1×1×512 feature map, that is, the foregoing feature vector corresponding to the image.

In the fourth module of the convolutional neural network, the 1×1×512 feature map is converted into 136-dimensional data by using a fully-connected layer FC1 and a fully-connected layer FC2. The data respectively represents horizontal and vertical coordinates of 68 face key points on the image.

The specific values of the parameters in the foregoing example are described only for illustrative purposes. On the premise of the concept of the disclosure, solutions using other parameter values also fall within the protection scope of the disclosure.

Although the operations of the method in the disclosure are described in a specific order in the accompanying drawings, this does not require or imply that the operations have to be performed in the specific order, or all the operations shown have to be performed to achieve an expected result. Additionally or alternatively, some operations may be omitted, a plurality of operations may be combined into one operation for execution, and/or one operation may be decomposed into a plurality of operations for execution, and the like.

Based on the foregoing face key point detection method, this example embodiment further provides a face key point detection apparatus.

Figure 12:
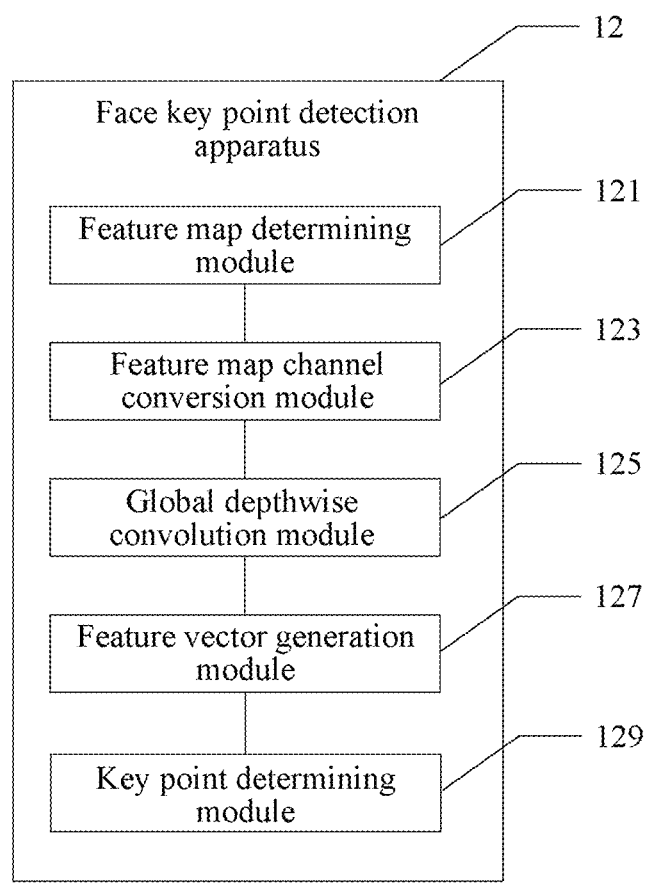
FIG. 12 is a schematic block diagram of a face key point detection apparatus according to an example implementation of the disclosure.

FIG. 12 is a schematic block diagram of a face key point detection apparatus according to an example implementation of the disclosure. Referring to FIG. 12, a face key point detection apparatus 12 according to the example implementation of the disclosure may include a feature map determining module 121, a feature map channel conversion module 123, a global depthwise convolution module 125, a feature vector generation module 127, and a key point determining module 129.

The feature map determining module 121 may be configured to determine, according to an image containing a face, a multi-channel feature map of the image; the feature map channel conversion module 123 may be configured to convert the multi-channel feature map into a predetermined channel quantity of target feature maps; the global depthwise convolution module 125 may be configured to perform one convolution operation on each target feature map in the predetermined channel quantity of target feature maps by using a convolution kernel corresponding to each target feature map; the feature vector generation module 127 may be configured to generate a feature vector corresponding to the image based on a result of the convolution operation on each target feature map; and the key point determining module 129 may be configured to determine key point coordinates of the face on the image according to the feature vector.

In the face key point detection apparatus according to the example implementation of the disclosure, one convolution operation is performed on each target feature map in the predetermined channel quantity of target feature maps of the image by using a convolution kernel corresponding to each target feature map, and a feature vector corresponding to the image is generated by using a result of each convolution operation, to determine key point coordinates of the face based on the feature vector. One convolution kernel performs one convolution operation merely on a target feature map of one channel, which may reduce a computing amount of determining key point coordinates while ensuring extraction of face key point information. In addition, the face key point detection method described in the disclosure has a relatively small computing amount, and thus may be better applied to low-power devices.

According to an example embodiment of the disclosure, in a process of performing one convolution operation, the convolution kernel has the same size as the corresponding target feature map.

Figure 13:
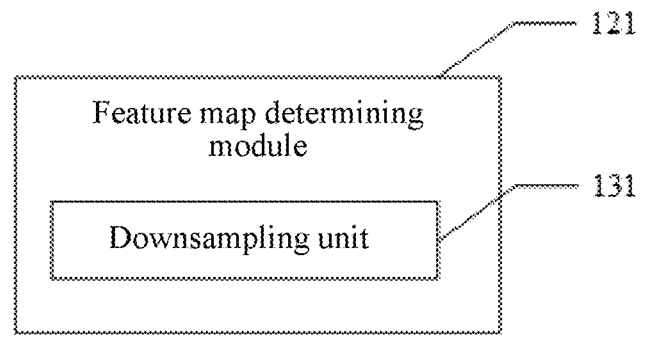
FIG. 13 is a schematic block diagram of a feature map determining module according to an example implementation of the disclosure.

According to an example embodiment of the disclosure, referring to FIG. 13, the feature map determining module 121 may include a downsampling unit 131.

The downsampling unit 131 may be configured to perform downsampling on the image, and determine the multi-channel feature map of the image.

Through the downsampling, the computing complexity of face key point detection is reduced.

According to an example embodiment of the disclosure, the downsampling unit is configured to perform a convolution operation on the image by using one convolution kernel or a plurality of cascaded convolution kernels, to perform downsampling on the image.

Figure 14:
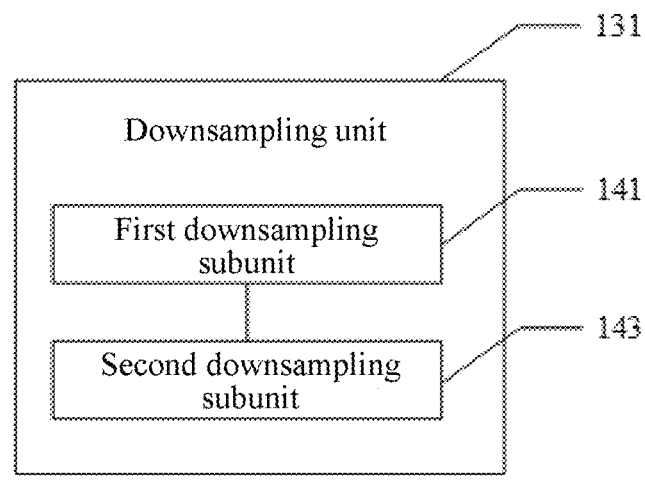
FIG. 14 is a schematic block diagram of a downsampling unit according to an example implementation of the disclosure.

According to an example embodiment of the disclosure, referring to FIG. 14, the downsampling unit 131 includes a first downsampling subunit 141 and a second downsampling subunit 143.

The first downsampling subunit 141 may be configured to perform a convolution operation on the image by using one convolution kernel or a plurality of cascaded convolution kernels, to generate an intermediate feature map; and the second downsampling subunit 143 may be configured to perform one or more groups of dimensionality reduction convolution processes on the intermediate feature map, to perform downsampling on the image.

According to an example embodiment of the disclosure, the dimensionality reduction convolution process includes: performing, by using N convolution kernels with a size of a×a, a convolution operation on a feature map to be subject to the dimensionality reduction convolution, to generate a first feature map; performing a convolution operation on the first feature map by using M convolution kernels with a size of b×b, to generate a second feature map; performing a depthwise convolution operation on the second feature map by using M convolution kernels with a size of c×c, to generate a third feature map; performing a convolution operation on the third feature map by using N convolution kernels with a size of d×d, to generate a fourth feature map; and adding the first feature map and the fourth feature map channel by channel to obtain a result of the dimensionality reduction convolution, where a, b, c, d, N, and M are all positive integers, and N is less than M.

Figure 15:
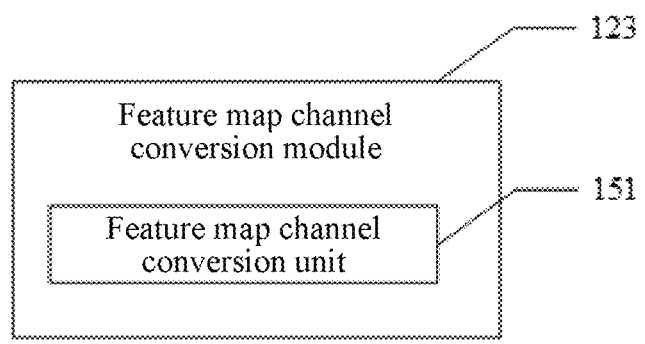
FIG. 15 is a schematic block diagram of a feature map channel conversion module according to an example implementation of the disclosure.

According to an example embodiment of the disclosure, referring to FIG. 15, the feature map channel conversion module 123 includes a feature map channel conversion unit 151.

Specifically, the feature map channel conversion unit 151 may be configured to determine a quantity of convolution kernels with a size of 1×1 as a target quantity according to a channel quantity of the multi-channel feature map and the predetermined channel quantity; and perform a convolution operation with a stride of 1 on the multi-channel feature map by using the target quantity of convolution kernels with a size of 1×1, to determine the predetermined channel quantity of target feature maps.

According to an example embodiment of the disclosure, the foregoing modules and units are included in a trained convolutional neural network, and the trained convolutional neural network performs the foregoing convolution operations.

Figure 16:
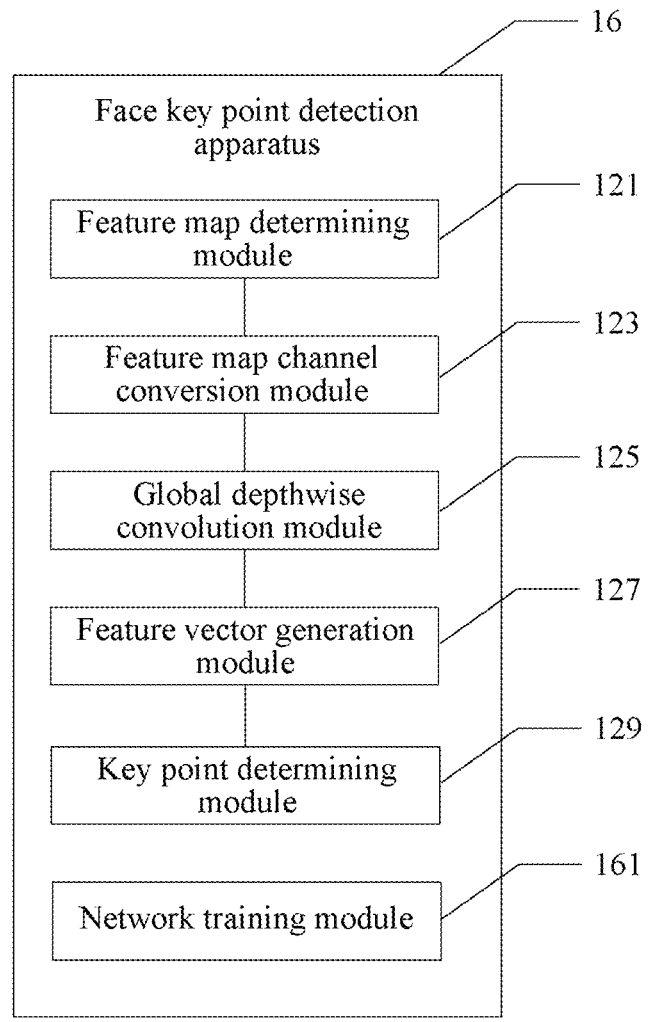
FIG. 16 is a schematic block diagram of a face key point detection apparatus according to another example implementation of the disclosure.

According to an example embodiment of the disclosure, referring to FIG. 16, compared with the face key point detection apparatus 12, a face key point detection apparatus 16 may further include a network training module 161.

The network training module 161 may be configured to obtain an image sample, input the image sample into a convolutional neural network, calculate a loss function of the convolutional neural network, and converge the loss function of the convolutional neural network, to determine the trained convolutional neural network.

Figure 17:
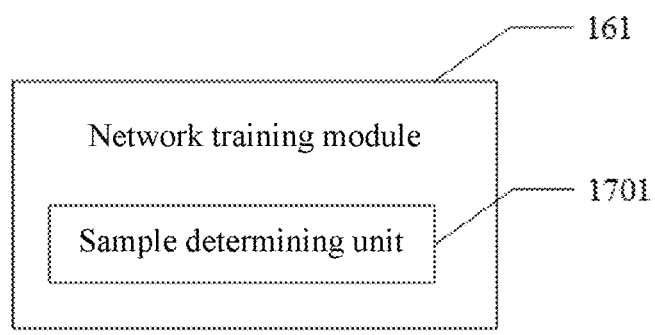
FIG. 17 is a schematic block diagram of a network training module according to an example implementation of the disclosure.

According to an example embodiment of the disclosure, referring to FIG. 17, the network training module 161 may include a sample determining unit 1701.

The sample determining unit 1701 may be configured to obtain an original image containing a face; determine a sample with an occluding object according to the original image; obtain annotation information of the sample with an occluding object; and use the sample with an occluding object and the annotation information as the image sample.

According to an example embodiment of the disclosure, the loss function of the convolutional neural network is calculated with reference to an occluding object loss function Lossocclusion represented by the following formula:

$$\text{Loss}_{occlusion} = \sum_{i=1}^{n} p_i \log(\text{sigmoid}(x_i)) + (1 - p_i)\log(1 - \text{sigmoid}(x_i))$$

where n represents a quantity of face key points; $p_i$ represents information about whether an $i^{th}$ key point is occluded, for example, if occluded, $p_i$ is 1, and if not occluded, $p_i$ is 0; and $x_i$ represents a feature outputted by the convolutional neural network.

The convolutional neural network is trained based on the image sample with an occluding object and the constructed occluding object loss function, which not only improves the generalization of the entire network, but also makes the network more versatile.

Because each functional module of the video image processing apparatus in this implementation of the disclosure is the same as that in the foregoing method embodiment, details are not described herein again.

In addition, the foregoing accompanying drawings are only schematic illustrations of the processing included in the method according to the example embodiments of the disclosure, and are not intended for limitation. It would be understood that the processes illustrated in the foregoing accompanying drawings do not indicate or define the chronological order of these processes. In addition, it would be understood that these processes may be performed, for example, synchronously or asynchronously in a plurality of modules.

Although a plurality of modules or units of a device configured to perform actions are discussed in the foregoing detailed description, such division is not mandatory. Actually, according to the implementations of the disclosure, the features and functions of two or more modules or units described above may be specifically implemented in one module or unit. On the contrary, the features and functions of one module or unit described above may be further divided to be embodied by a plurality of modules or units.

After considering the specification and implementing the present disclosure, a person skilled in the art may readily think of other embodiments of the disclosure. The disclosure is intended to cover any variations, uses, or adaptive changes of the disclosure. These variations, uses, or adaptive changes follow the general principles of the disclosure and include common general knowledge or common technical means in the art, which are not disclosed in the disclosure. The specification and the embodiments are considered as merely example, and the scope and spirit of the disclosure are pointed out in the following claims.

In the technical solutions provided by example embodiments of the disclosure, one convolution operation is performed on each target feature map in the predetermined channel quantity of target feature maps of the image by using a convolution kernel corresponding to each target feature map, and a feature vector corresponding to the image is generated by using a result of each convolution operation, to determine key point coordinates of the face based on the feature vector. In an example embodiment of the disclosure, a depthwise convolution manner is used, that is, one convolution kernel performs one convolution operation merely on a target feature map of one channel, which may reduce a computing amount of determining key point coordinates while ensuring accurate extraction of face key point information. In addition, the face key point detection method described in the disclosure has a relatively small computing amount, and thus may be better applied to low-power devices.

A person of ordinary skill in the art would understand that all or some of the operations of the methods in the embodiments may be implemented by a program instructing relevant hardware. The program may be stored in a computer-readable storage medium. The computer-readable storage medium may be the computer-readable storage medium included in the memory in the foregoing embodiment, or may be a computer-readable storage medium that exists independently and that is not assembled in a terminal. The computer-readable storage medium stores at least one instruction, at least one program, a code set or an instruction set. The at least one instruction, the at least one program, the code set, or the instruction set is loaded or executed by the processor to implement the face key point detection according to any of the foregoing method embodiments.

The computer-readable storage medium includes volatile and non-volatile media, and removable and non-removable media implemented by using any method or technology used for storing information such as computer-readable instructions, data structures, program modules, or other data. The computer-storage medium includes a RAM, a ROM, an erasable programmable ROM (EPROM), an electrically erasable programmable ROM (EEPROM), a flash memory or another solid-state storage technology, a compact disc read only memory (CD-ROM), a digital versatile disc (DVD) or another optical storage, a magnetic cassette, a magnetic tape, or a magnetic disk storage or another magnetic storage device. It should be noted that the computer-readable storage medium is not limited to the foregoing several types.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

It is to be understood that the disclosure is not limited to the precise structures described above and shown in the accompanying drawings, and various modifications and changes may be made without departing from the scope of the disclosure. The scope of the disclosure is subject only to the appended claims.

What is claimed is:

1. A face key point detection method, performed by an electronic device, the method comprising:
    determining, according to an image containing a face, a multi-channel feature map of the image;
    converting the multi-channel feature map into a predetermined channel quantity of target feature maps;
    performing a convolution operation on each target feature map in the predetermined channel quantity of target feature maps by using a convolution kernel corresponding to each target feature map;
    generating a feature vector corresponding to the image based on a result of the convolution operation on each target feature map; and
    determining key point coordinates of the face on the image according to the feature vector.

2. The face key point detection method according to claim 1, wherein the convolution kernel has the same size as a corresponding target feature map.

3. The face key point detection method according to claim 1, wherein the determining the multi-channel feature map comprises:
    performing downsampling on the image, to determine the multi-channel feature map of the image.

4. The face key point detection method according to claim 3, wherein the performing the downsampling comprises:
    performing a convolution operation on the image by using one convolution kernel or a plurality of cascaded convolution kernels, to perform the downsampling on the image.

5. The face key point detection method according to claim 4, wherein the performing the convolution operation on the image by using the one or the plurality of cascaded convolution kernels comprises:
    performing the convolution operation on the image by using the one convolution kernel or the plurality of cascaded convolution kernels, to generate an intermediate feature map; and
    performing one or more groups of dimensionality reduction convolutions on the intermediate feature map, to perform the downsampling on the image.

6. The face key point detection method according to claim 5, wherein a dimensionality reduction convolution in the one or more groups of dimensionality reduction convolutions comprises:
    performing, by using N convolution kernels with a size of a×a, a convolution operation on a feature map to be subject to the dimensionality reduction convolution, to generate a first feature map;
    performing a convolution operation on the first feature map by using M convolution kernels with a size of b×b, to generate a second feature map;
    performing a depthwise convolution operation on the second feature map by using M convolution kernels with a size of c×c, to generate a third feature map;
    performing a convolution operation on the third feature map by using N convolution kernels with a size of d×d, to generate a fourth feature map; and
    adding the first feature map and the fourth feature map, channel by channel, to obtain a result of the dimensionality reduction convolution, wherein
    a, b, c, d, N, and M are all positive integers, and N is less than M.

7. The face key point detection method according to claim 1, wherein the converting the multi-channel feature map comprises:
    determining a target quantity of convolution kernels with a size of 1×1 according to a channel quantity of the multi-channel feature map and the predetermined channel quantity; and
    performing a convolution operation with a stride of 1 on the multi-channel feature map by using the target quantity of convolution kernels with the size of 1×1, to determine the target feature maps.

8. The face key point detection method according to claim 1, wherein each of the convolution operation is performed by using a trained convolutional neural network.

9. The face key point detection method according to claim 8, further comprising:
    obtaining an image sample; and
    inputting the image sample into a convolutional neural network, calculating a loss function of the convolutional neural network, and converging the loss function of the convolutional neural network, to determine the trained convolutional neural network.

10. The face key point detection method according to claim 9, wherein the obtaining the image sample comprises:
    obtaining an original image containing a face;
    determining a sample with an occluding object according to the original image;
    obtaining annotation information of the sample with the occluding object; and
    using the sample with the occluding object and the annotation information as the image sample.

11. A face key point detection apparatus, comprising:
    at least one memory configured to store program code; and
    at least one processor configured to read the program code and operate as instructed by the program code, the program code comprising:
        feature map determining code configured to cause at least one of the at least one processor to determine, according to an image containing a face, a multi-channel feature map of the image;

feature map channel conversion code configured to cause at least one of the at least one processor to convert the multi-channel feature map into a predetermined channel quantity of target feature maps;
global depthwise convolution code configured to cause at least one of the at least one processor to perform a convolution operation on each target feature map in the predetermined channel quantity of target feature maps by using a convolution kernel corresponding to each target feature map;
feature vector generation code configured to cause at least one of the at least one processor to generate a feature vector corresponding to the image based on a result of the convolution operation on each target feature map; and
key point determining code configured to cause at least one of the at least one processor to determine key point coordinates of the face on the image according to the feature vector.

12. The face key point detection apparatus according to claim 11, wherein the convolution kernel has the same size as a corresponding target feature map.

13. The face key point detection apparatus according to claim 11, wherein the feature map determining code is further configured to cause at least one of the at least one processor to perform downsampling on the image, to determine the multi-channel feature map of the image.

14. The face key point detection apparatus according to claim 13, wherein the feature map determining code is further configured to cause at least one of the at least one processor to perform a convolution operation on the image by using one convolution kernel or a plurality of cascaded convolution kernels, to perform the downsampling on the image.

15. The face key point detection apparatus according to claim 14, wherein the feature map determining code is further configured to cause at least one of the at least one processor to perform the convolution operation on the image by using the one convolution kernel or the plurality of cascaded convolution kernels, to generate an intermediate feature map; and perform one or more groups of dimensionality reduction convolutions on the intermediate feature map, to perform the downsampling on the image.

16. The face key point detection apparatus according to claim 15, wherein a dimensionality reduction convolution in the one or more groups of dimensionality reduction convolutions comprises:
performing, by using N convolution kernels with a size of a×a, a convolution operation on a feature map to be subject to the dimensionality reduction convolution, to generate a first feature map;
performing a convolution operation on the first feature map by using M convolution kernels with a size of b×b, to generate a second feature map;
performing a depthwise convolution operation on the second feature map by using M convolution kernels with a size of c×c, to generate a third feature map;
performing a convolution operation on the third feature map by using N convolution kernels with a size of d×d, to generate a fourth feature map; and
adding the first feature map and the fourth feature map, channel by channel, to obtain a result of the dimensionality reduction convolution, wherein
a, b, c, d, N, and M are all positive integers, and N is less than M.

17. The face key point detection apparatus according to claim 11, wherein the feature map channel conversion code is further configured to cause at least one of the at least one processor to determine a target quantity of convolution kernels with a size of 1×1 according to a channel quantity of the multi-channel feature map and the predetermined channel quantity; and perform a convolution operation with a stride of 1 on the multi-channel feature map by using the target quantity of convolution kernels with the size of 1×1, to determine the target feature maps.

18. The face key point detection apparatus according to claim 11, wherein each of the convolution operation is performed by using a trained convolutional neural network.

19. A non-transitory computer-readable medium, storing a computer program, the computer program being executable by at least one processor to cause the at least one processor to perform:
determining, according to an image containing a face, a multi-channel feature map of the image;
converting the multi-channel feature map into a predetermined channel quantity of target feature maps;
performing a convolution operation on each target feature map in the predetermined channel quantity of target feature maps by using a convolution kernel corresponding to each target feature map;
generating a feature vector corresponding to the image based on a result of the convolution operation on each target feature map; and
determining key point coordinates of the face on the image according to the feature vector.

20. An electronic device, comprising:
one or more processors; and
a storage apparatus, configured to store one or more programs, the one or more programs, when executed by the one or more processors, causing the one or more processors to implement the face key point detection method according to claim 1.

* * * * *